United States Patent Office 3,425,328
Patented Feb. 4, 1969

3,425,328
PHOTOGRAPHIC EXPOSURE CONTROL SYSTEM
Yasunori Ichijo, Kawasaki-shi, and Yukio Nakamura, Chiba-ken, Japan, assignors to Kabushiki Kaisha Hattori Tokeiten
Original application June 30, 1964, Ser. No. 379,155, now Patent No. 3,373,672, dated Mar. 19, 1968. Divided and this application Nov. 23, 1966, Ser. No. 596,583
U.S. Cl. 95—10                          3 Claims
Int. Cl. G01j 1/52

ABSTRACT OF THE DISCLOSURE

A camera lens shutter electronic control circuit is shown for selectively varying the effective exposure time in accordance with the aperture opening and ambient light conditions. The control circuit comprises a transistorized R-C timing circuit where the resistance component is a cadmium sulphide cell whose resistance varies inversely with the intensity of light impinging thereon, to selectively vary the charging time constant of the R-C circuit.

---

This is a division of application Ser. No. 379,155 filed June 30, 1964 now Patent No. 3,375,672.

The present invention relates to a photographic camera lens shutter system which provides for automatic camera operation without the use of a separate exposure meter, and where a pair of shutter blades control both the shutter speed and aperture exposure. The advantage of such a lens shutter system resides in the fact that, whereas, two pairs of sector blades are necessary in presently used camera systems, in the present invention, only one pair of sector blades control both the shutter speed and aperture opening.

In the present invention, an opening shutter member and a shutting shutter member are provided with each of these members being driven by its independent motive power for opening and closing the aperture respectively. The opening shutter member is connected to a delayed action governor so that the time taken to achieve full opening of the aperture may be preselected in accordance with the particular camera used and the requirements of the subject to be photographed. Generally, for ordinary amateur use, the time for full opening of the aperture will be typically 16 milliseconds. The shutting member, which is driven by its own motive power is operative to close the shutting member at a high speed typically less than 10 milliseconds.

An important feature of the present invention is the control of the shutting member by a magnet in combination with an electronic delay circuit which is operative to automatically adjust the exposure time in accordance with the illumination intensity of the subject to be photographed.

Typically when the diaphragm aperture is f/2.8 the shutting member aperture will be released by the magnet to close the aperture in about 6 milliseconds. In such a case, the time for achieving complete opening of the aperture is about 66 milliseconds and the effective exposure time is 33 milliseconds i.e. about 1/30 of a second for f/2.8 and the light intensity L.V. equal 8. For the case of a light intensity L.V. equal 17 and an aperture f/22 the time delay for the shutting member is 7 milliseconds and the shutting member closes the aperture sector in one millisecond to achieve an effective exposure time of four milliseconds (about 1/250 of a second). Thus, the delay time between actuation and operation of the shutting member and the aperture size can correspond to a preselected relation between the opening time and the aperture, while the delay time of the shutting member is controlled by a magnet in response to the light intensity of the subject.

An important feature of the present invention resides in the provision of an alarm circuit to indicate when there is an insufficient amount of light coming from the subject to be photographed in order to obtain suitable exposure. Accordingly before the opening sectors begin to open, the release member closes a switch connected to the alarm lamp so that the alarm lamp will be lighted and visible in the view finder of the camera.

A further feature of the present invention resides in the provision of a switch circuit whereby the opening shutter member at the begining of operation closes a switch when the shutter is released, and by virtue of the movement of the opening shutter member a time interval from the closing of the magnet switch to the beginning of the opening of the sectors may be made constant, thereby insuring that the begining time of operation of the shutting member by the magnet is relative to the light intensity of the subject only.

The present invention provides a shutter control system for an automatic exposure camera in which the sectors open gradually to a determined relation between the shutter time and diaphragm aperture and wherein the closing magnet is automatically controlled by an electronic control circuit.

The features of the invention will be apparent from the following detailed description of embodiments as illustrated in the accompanying drawings, in which;

FIG. 8 shows another embodiment of a shutter mechanism in which the sectors are opened a little.

Figure 1:
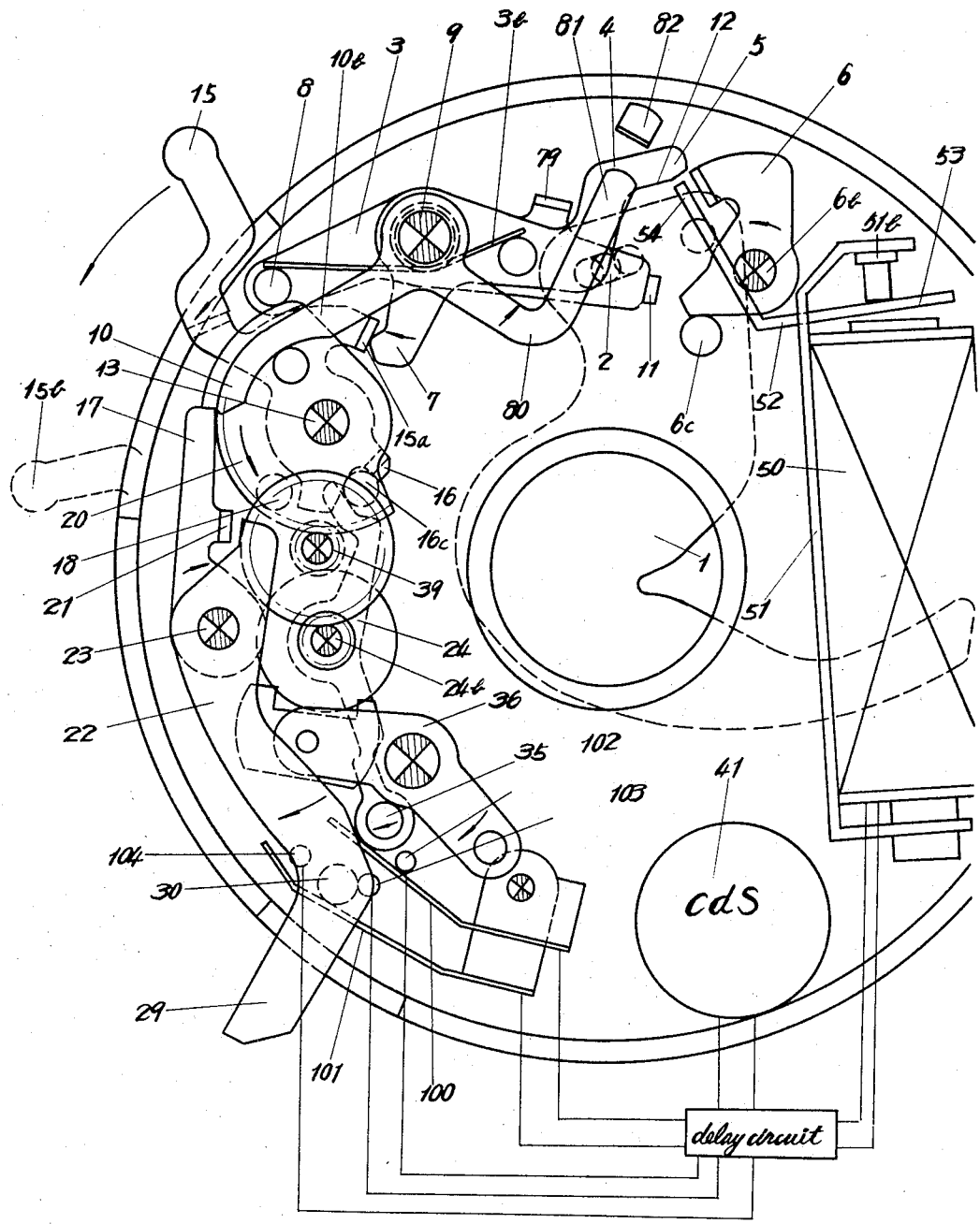
FIG. 1 is a front elevation view of shutter mechanism for embodiment of the present invention, and showing the shutter in the cocked position.

In FIG. 1, sector 1, which is one of several sectors which controls both shutters speed and diaphragm opening, is shown engaging pin 2 on the sector opening member 3. Opening member 3 is urged by a spring-force in the counter-clockwise direction and shutting member 4 is urged in the clockwise direction. The projection 11 extending from opening member 3 is shown selectively engaging portion 12 of shutting member 4. Both members 3 and 4 are coaxially mounted on pin 9, with one end 5 of shutting member 4 engaging arresting lever 6, and the other end 7 engaging projection 15a of shutter cocking member 15. The device is cocked by moving the cocking member 15 clockwise around the axis 13.

FIG. 1 shows the position of the various members when operation is completed. When the external cocking force is removed, member 15 goes back to its initial position 15b, the charged position being where the member 15 collides against pin 18.

The first gear 10 is situated on axis pin 13 and has applied thereto a spring counter-clockwise rotation force. When the cocking member is cocked, the portion 16 of the member 15 pushes pin 16c, while the first gear 10 is cocked in a clockwise direction, so that gear 10 is arrested by arresting lever 17 and the member 15 returns to its original position separately.

The arresting lever 17 pivoted on axis pin 23 has applied thereto a clockwise spring force and falls into a jaw in the first gear 10 after the latter is cocked. As shown, first gear 10 is coupled with several gears, a star wheel and an anchor.

Release lever 22 which is situated on pin axis 23, is also under a counter-clockwise spring action force. An external force to provide release action is applied to one end 29 of the release lever 22. Pin 30, made of insulating material, sits on the lever 22 and is operative to push the contact 101 towards the outside by virtue of the spring power of release lever 22.

Contact 101 is spring urged inwardly and is caused to engage terminal 104, when lever 29 is pushed and pin 30 moves inwardly. Electric delay circuit switching lever 24 is rotatably spring mounted on axis 24b and is rotatable in a counter-clockwise direction, so that portion 16 of the cocking member 15 pushes the pin 16c when cocking member 15 is cocked. As pin 35 of insulating material is fixed to the switching lever 24 of the delay circuit.

When cocking member 15 is cocked electric delay circuit switching lever 24 rotates about pin 16c, pin 35 moves inwardly, contact 100 and pin 35 disengage from each other and terminal 102 and contact 100 make contact. Contacts 100, 101, and terminals 102, 104 are electrically coupled with Cds cell 41, while magnet 50 of the delay circuit is coupled with magnet yoke 51 and armature 52. The arresting lever 6 of shutting member 4 has applied thereto a spring counter clockwise force about axis 6b, with pin 6c limiting the angle of rotation of the lever 6. In the position shown in FIG. 1, arresting lever 6 is closing shutting member 4 with pin 6c acting as a stop for further rotation with portion 54 of armature 52 being in close proximity to arresting lever 6 in the cocked position.

As armature 52 starts to move, being drawn by magnet 50, it strikes against lever 6 with accelerated speed to thereby release the shutting member 4.

Figure 2:
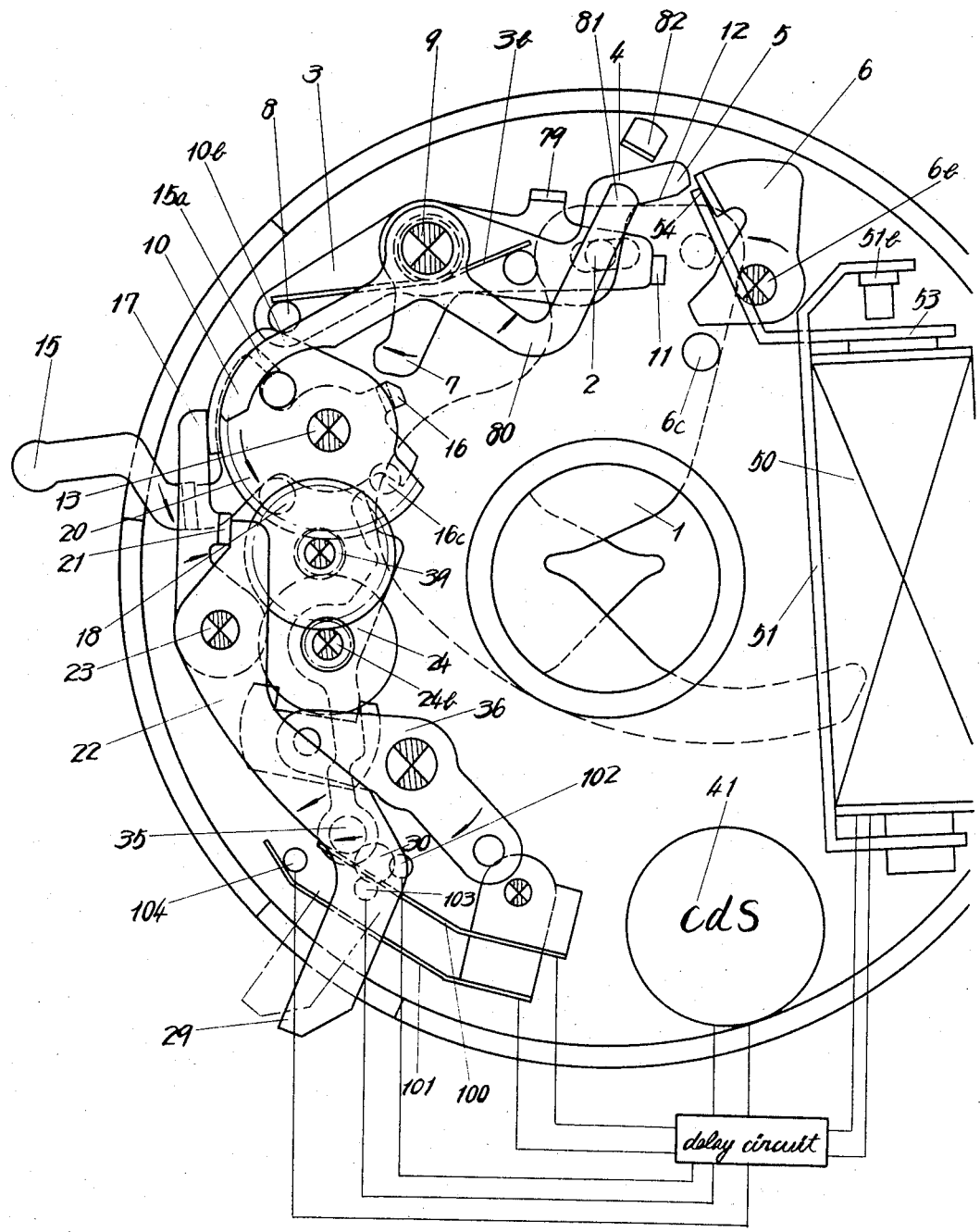
FIG. 2 is a view similar to FIG. 1 but showing that the sectors are going to shut, with the shutting member being released by magnet force, whereby, after the shutter is released, the sectors are opened in a predetermined aperture at a predetermined time.

As described above, FIG. 1 illustrates the cocked position of the device, while FIG. 2 shows the sectors beginning to shut, releasing shutting member 4 as a result of the actuation of the magnet after the sectors have opened to a predetermined size.

When portion 29 of the release lever 22 is pushed, an alarm circuit, as more fully explained hereafter, is closed, and the release lever disengages locking lever 17 from first gear 10 by pushing portion 21 of locking lever 17. Accordingly first gear 10 begins to turn in a counter-clockwise direction under its spring power moving slowly since it is coupled with other gears. Cam part 10b of first gear 10 is coupled with pin 8 fixed on the opening member 3 and pin 8 slides along the cam surface of cam 10b in accordance with the rotation of first gear 10, and the opening member 3 gradually opens sector 1, when turned in a counter-clockwise direction by the force of spring 3b. The time interval during which sectors open to the prescribed size is previously to be determined in accordance with object of use in that occasion.

Figure 4:
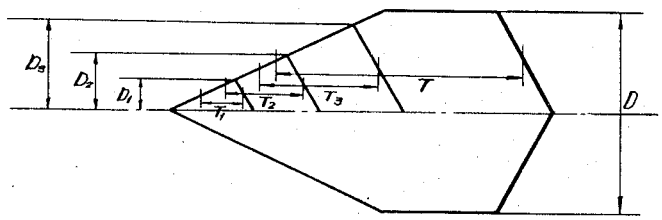
FIG. 4 shows schematically the actuation of opening and shutting movement of the sectors.

The relation between the size of the aperture and the opening time interval is diagramatically shown in FIG. 4 with the diaphragm and shutter speed being previously programmed. By rotating the arresting lever 6 of shutting member 4 by magnet 50, shutting lever 4 is released and portion 12 keeps in contact with portion 11 of opening member 3. Accordingly, shutting member 4 turns in a clock-wise direction together with opening member 3 by force of a spring (not shown) to close sector 1. Shutting member 4 is urged in a clockwise direction by another spring (not shown) in addition to spring 3b, but now shown in the figures.

Figure 3:
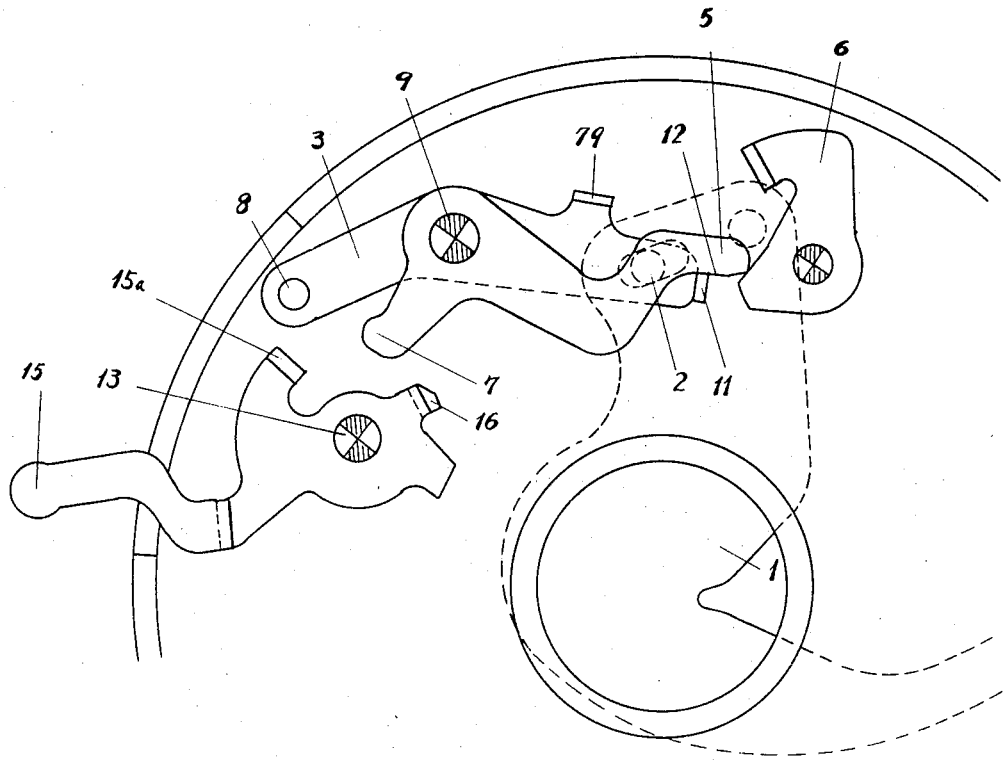
FIG. 3 shows the sectors when shut, and the exposure is finished.

FIG. 3 shows the closed position of the sectors with opening member 3 and shutting member 4 turning in the clockwise direction.

FIG. 4 diagramatically shows the many possible combinations between effective exposure time T1, T2, T3 . . . and aperture size D1, D2, D3 . . . showing sectors opened to predetermined size and sectors shut by means of releasing of the shutting member. For example, T3 and D3 is the combination in the case of a large light intensity T1 and D1 in case of small light intensity.

Figure 5:
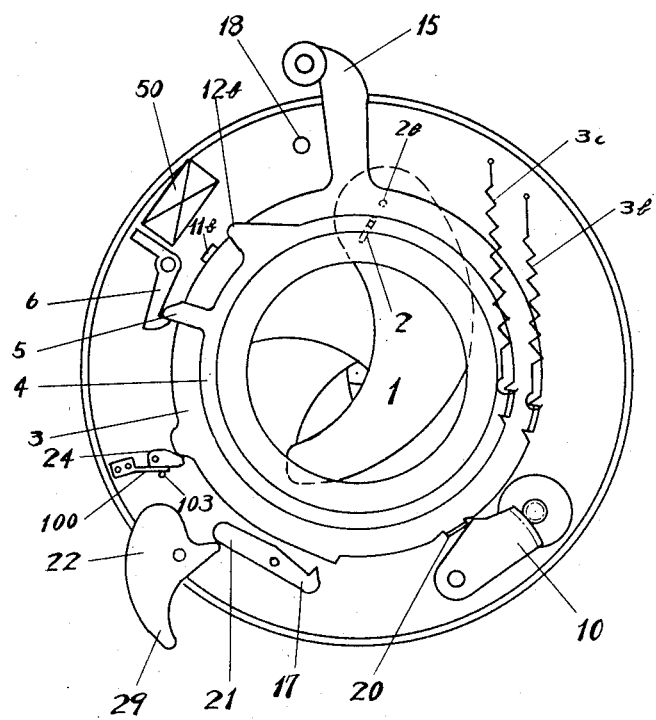
FIG. 5 shows an embodiment of the present invention as comprising an electronic timing circuit.

Referring to FIG. 5, there is shown an electronic automatic exposure control for use in the present lens shutter system to provide an exposure time corresponding to the light intensity conditions of the subject to be photographed. The aforementioned electronic exposure control circuit comprises a transistorized Schmitt trigger circuit in conjunction with a photo sensitive cadmium sulphide cell for determining the light intensity. The control circuit of FIG. 5 further includes an alarm circuit for indicating when the light intensity of the subject is inadequate for the preset diaphragm aperture.

The Schmitt trigger circuit comprises transistor Q1 and Q2 having their emitters connected together to emitter resistor R3. A driving transistor Q3 has its base connected to the emitter of Q1 through coupling resistor R1, and the collector of Q1 is coupled to the base of transistor Q2 via resistor R2. A cadmium sulphide cell, indicated as Rc, is connected between the emitter of transistor Q3 and the base of transistor Q1, while the collector of transistor Q2 is connected to the emitter of transistor Q3 through resistor R4. Magnetic coil 50 is provided for driving the shutter blades and is connected at one end to the collector of transistor Q3 with the other and thereof being connected to the base of transistor Q1 through capacitor C. A single pole double throw shutter control switch is provided and comprises switch arm 100 and switch contacts 102 and 103 respectively, with contact 103 being connected to the junction of capacitor C and coil 50. The supply voltage is provided by battery E having its positive terminal connected to resistor R3 and its negative terminal connected to cadmium sulphide cell Rc through switch contacts 101 and 104. Switch contact 102 is connected to the base of transistor Q1 through the series arrangement of diode D and resistor R5.

The Schmitt circuit is operative to determine whether the ratio of the voltage on the base of transistor Q1, to the potential on the positive terminal of battery source E, is higher or lower than a preselected reference value, this reference value being the product of the resistor R3 and the emitter current of transistor Q2 in the conductive state.

The operation of the electronic control circuit of FIG. 5 is as follows: contacts 101 and 104 are closed providing a current path through the positive terminal of battery E, contact arm 100, through terminal 102, diode D, through resistor R5 and photo-sensitive conductor Rc, with the base voltage of transistor Q1 being the ratio of the resistance of resistor R5 and the photoconductor Rc. If the base voltage of transistor Q1 is lower than the emitter voltage of transistor Q2 in the conductive state, the base current of transistor Q1 will flow from the emitter to the base of transistor Q1, causing the transistor Q1 to become conductive with current flowing from the emitter through the collector of transistor Q1, through resistor R1, the base of transistor Q3, and the emitter of Q3, causing transistor Q3 to become conductive.

If the base voltage of transistor Q1 is higher than the emitter voltage of transistor Q2, there will be no base current through transistor Q1, and transistor Q1 will remain non-conductive, and accordingly transistor Q3 will be non-conductive.

The alarm circuitry generally shown at alarm lamp L is operative as follows. When transistor Q3 becomes conductive, current will flow through battery E, contact 100, switch terminal 102, resistor R6, and through the collector to emitter path of transistor Q3, with no current flowing through lamp L. However, when transistor Q3 becomes non-conductive, current will flow through battery E, contact 100, switch 102, resistor R6, and through lamp L causing it to light up.

When the ambient light intensity is lower than a preselected level, the resistance of photoconductor Rc will accordingly be higher than the corresponding resistance value, and, therefore, the base voltage of transistor Q1 will be higher than the corresponding preselected voltage, causing transistor Q1 to be rendered non-conductive and lamp L, accordingly, to become lit. However, when the ambient light intensity is higher than the preselected value, the resistance of photoconductor Rc will be less than the preselected value, and thus the base voltage of transistor Q1 will be lower than the preselected voltage, causing transistor Q1 to become conductive and lamp L to remain unlit.

When switch arm 100 makes contact with stationary contact 103, current will flow from the positive terminal of battery E, through capacitor C, photoconductor Rc, switch contacts 101 and 104, through battery E. At the same time another current path is produced from the positive terminal of battery E through resistor R3, the emitter to base conduction path of transistor Q2, through resistor R2, resistor R1, through the base to emitter current conduction path of transistor Q3, and through switch contacts 101 and 104 to battery E.

A third conduction path is set up at the same time, from the positive terminal of battery E, resistor R3, through the emitter to collector path of transistor Q2, through resistor R4, switch contacts 101 and 104, to battery E. During this time, the base voltage of transistor Q1 will be substantially equal to the stored charge voltage across capacitor C. The charged voltage developed across capacitor C increases with time, and when this charged voltage is lower than the voltage on the emitters of transistors Q1 and Q2, base current will flow from the emitter to base of transistor Q1, causing transistor Q1 to become conductive.

During the period of conduction of transistor Q2, the voltage across resistor Q3 developed by the emitter current of transistor Q2 will constitute the above-mentioned reference voltage. The time required for the charged voltage across capacitor C to build up to the reference voltage will depend on the product of the capacitance of capacitor C, and the resistance of photoconductor Rc, this time representing the Rc delay i.e., exposure time.

When transistor Q1 becomes conductive, transistor Q3 will also be rendered conductive, with current flowing from the positive terminal of battery E, through magnetic coil 50, through the collector to emitter path of transistor Q3, and back to the negative terminal of battery E, causing magnetic coil 50 to energize. Thus, the delay, or exposure time, which corresponds to the Rc time constant of capacitor C and photoconductor Rc will be inversely proportional to the ambient illumination i.e., will be short when the ambient illumination is at a high level, and will be long when the ambient illumination is at a low level.

Figure 6:
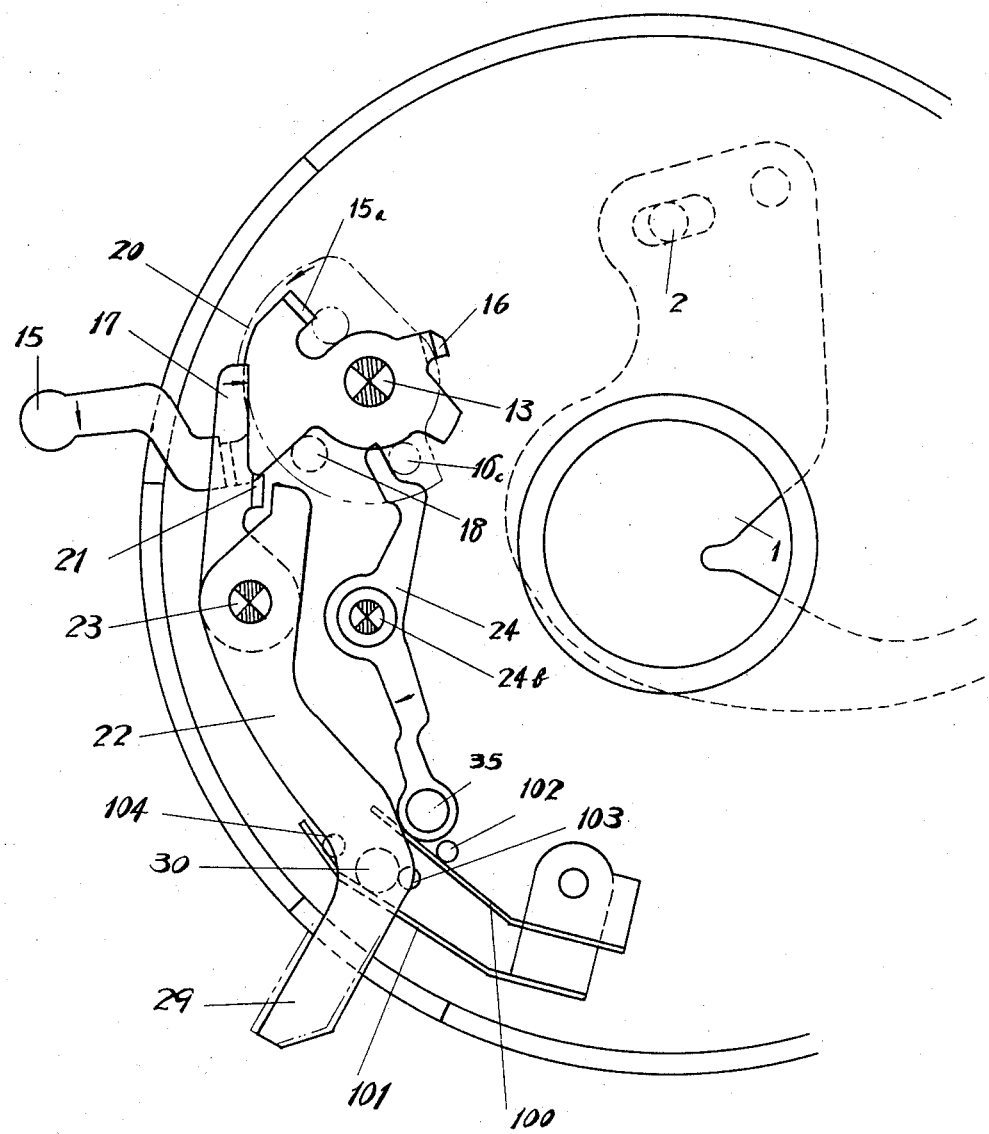
FIG. 6 shows the switch of the device in the closed position.

FIG. 6 illustrates a situation in which the switch of the alarming lamp is on initially after releasing, that is R4 is so selected that the lamp 1 shown in FIG. 5 is lighted only in case that subject is too dark to be photographed by bringing terminal 101 in contact with terminal 104.

Figure 7:
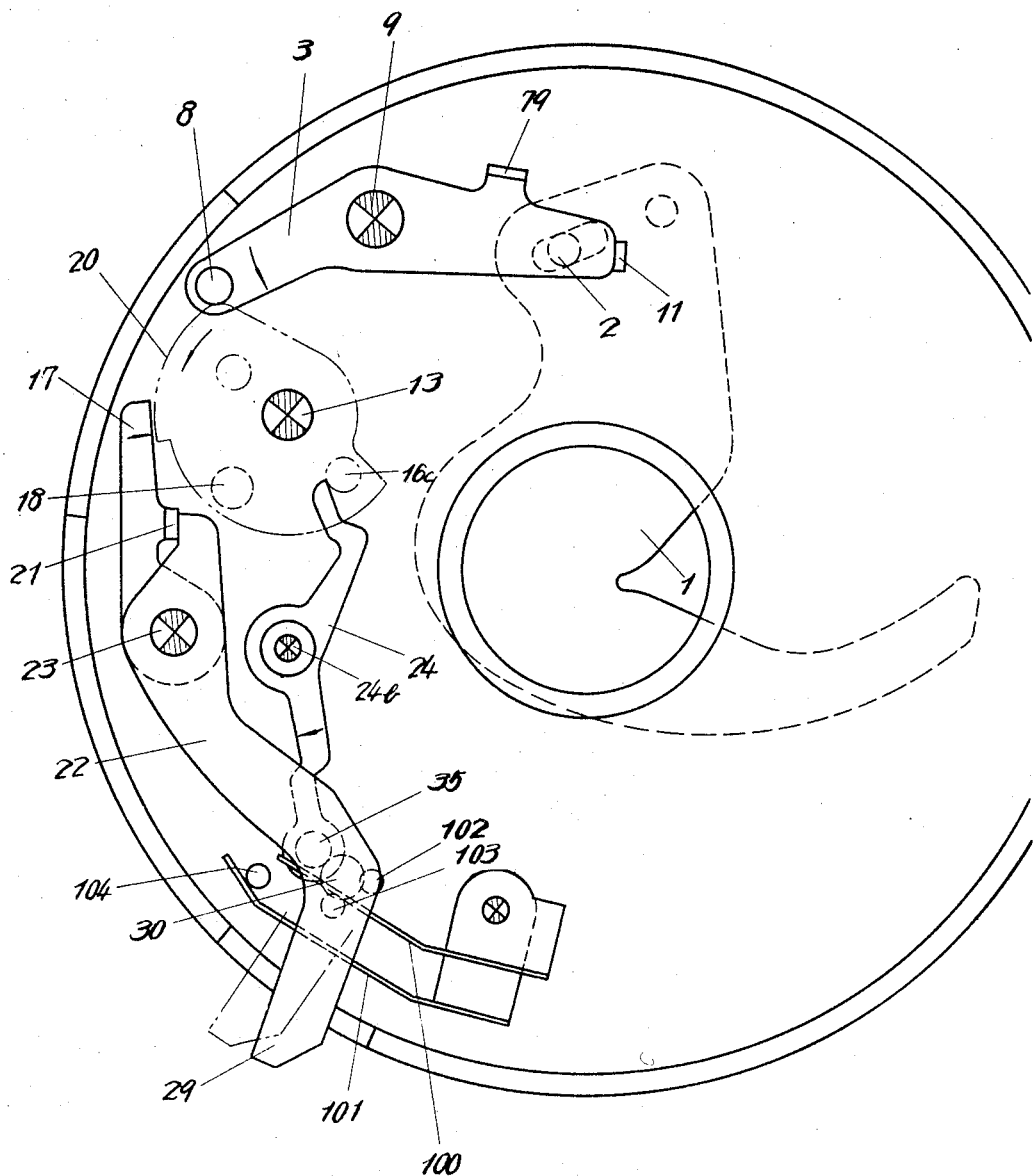
FIG. 7 shows the magnet switch in the closed position.

FIG. 7 shows a situation in which the magnet switch is on after shutter is released, that is, contact 100 is brought into contact with terminal 103, so that the circuit shown in FIG. 5 is closed and current flows through magnet 50.

In FIG. 8, another embodiment of the invention is shown in which the opening member and the shutting member are both of the ring type. Each support of sector 1 is engaged on both the above members respectively, so that the sectors open gradually keeping contact with governor 10 after releasing of the opening member.

When the magnet releases the shutting member, the same rotates rapidly and closes the sectors while keeping contact with the opening member. Thereafter the sectors may rotate together with both the opening and shutting members as the case may be.

In order to facilitate a clear understanding of the operation of the preferred embodiment of the present invention, the directions of the spring force, as indicated by arrows, have been shown rather than the springs themselves.

While there has been shown a particular embodiment of the invention, it will be understood that it is not wished to be limited thereto, since modifications can be made both in the circuit arrangements and instrumentalities employed and it is contemplated, in the appended claims to cover any such modifications as fall within the time spirit and scope of this invention.

What is claimed is:

1. A camera exposure control circuit comprising a unipotential voltage source having a pair of output terminals; a charging circuit comprising a photoconductor and a charging capacitor in series arrangement, said photoconductor being connected between one end of said charging capacitor and one of said source output terminals; a single pole double throw switch for selectively connecting said voltage source to said charging circuit including a contact arm connected to the other of said source output terminals and first and second stationary contacts, said first stationary contact being connected to the other end of said charging capacitor; a Schmitt trigger circuit comprising first and second transistors, and a common emitter resistor having one end connected to the junction of the emitter of said first and second transistors and the other end thereof connected to said other of said source output terminals with the base of said first transistor being connected to the junction of said photoconductor and said charging capacitor; a voltage reference constituting the voltage developed across said common emitter resistor, whereby upon the connection of said voltage source to said charging circuit the voltage applied to the base of said first transistor varies at a rate determined by the resistance of said photoconductor which corresponds to the ambient light level, the voltage applied to the collector of said first transistor being determined by the difference between the voltage applied to the base of said first transistor by said charging capacitor, and the voltage applied to the emitter of said first transistor by said reference; a driving transistor; a coupling resistor, said driving transistor having its base connected to the collector of said first transistor through said coupling resistor; a diode; third and fourth resistors, said second stationary contact being connected to the collector of said driving transistor by said third resistor, said second stationary contact being further connected to the base of said first transistor through a series arrangement comprising said diode and said fourth resistor; and a solenoid coil for attracting or releasing camera shutter blades, said solenoid being connected between the collector of said driving transistor and said switch means, whereby upon the connection of said charging circuit across said voltage source terminals, said driving transistor is caused to conduct and hence energize said solenoid coil after a period of time determined by the instantaneous resistance of said photoconductor thereby causing the camera shutter blades to close.

2. A camera exposure control circuit as defined in claim 1, including an alarm circuit for indicating when the ambient light level is less than a predetermined level by applying said movable arm contact to said second stationary contact, said alarm circuit comprising a lamp connected cross the emitter to collector terminals of said driving transistor, whereby said lamp is short circuited by said driving transistor emitter to collector current conduction path when said ambient light level is less than a preselected level, said lamp being rendered in series arrangement with said third resistor and said voltage source terminals when said ambient light level is less than said predetermined level.

3. A camera exposure control circuit as defined in claim 2, wherein said photoconductor comprises a cadmium sulphide cell whose resistance varies inversely with the intensity of the light impinging thereon.

References Cited

UNITED STATES PATENTS

| | | | |
|---|---|---|---|
| 3,205,799 | 9/1965 | Burgarella et al. | 95—10 |
| 3,208,365 | 9/1965 | Cooper et al. | 95—10 |
| 3,257,919 | 6/1966 | Sato et al. | 95—10 |
| 3,292,516 | 12/1966 | Sato et al. | 95—10 |

NORTON ANSHER, *Primary Examiner.*

J.F. PETERS, JR., *Assistant Examiner.*

U.S. Cl. X.R.

95—53; 317—124